June 21, 1966    D. B. PALL    3,257,315
STERILIZATION OF WATER
Filed Dec. 13, 1963

United States Patent Office 3,257,315
Patented June 21, 1966

3,257,315
STERILIZATION OF WATER
David B. Pall, Roslyn Estates, N.Y., assignor to Pall Corporation, Glen Cove, N.Y., a corporation of New York
Filed Dec. 13, 1963, Ser. No. 330,320
7 Claims. (Cl. 210—64)

This application relates to a method of sterilizing water which comprises supplying silver ion to the water from a reservoir of solid silver bromide.

Processes for sterilizing liquids, particularly water, by contacting them with ionized oligodynamically active metals are well known, silver being the most commonly employed oligodynamically active metal. However, silver is insoluble in water and most liquids and in order to supply silver ion for sterilization purposes, the liquid to be sterilized has been either passed through particulate silver at a rate sufficiently slow to permit the silver to act upon and sterilize the water passing through it, or colloidal particles of silver have been added to the water for a sufficient contact time, after which they must be removed. Representative of the former technique are U.S. Patent No. 1,988,246 to Krause and U.S. Patent No. 1,642,089 to Schreier. The latter technique is shown in U.S. Patent No. 2,046,467 to Krause, where ionic silver is supplied to water by electrolysis, and then removed.

These prior art methods require careful control to supply the correct amount of silver for sterilization, as well as removal of excess silver ion thereafter, since silver ion is poisonous to humans in sufficient amounts. The maximum acceptable silver ion concentration in water intended for human consumption as specified in U.S. Public Health Service "Drinking Water Standards 1962" is established at about 50 parts per billion. Also, it is impossible to control amounts so as to provide enough residual silver ion below the poisonous level to prevent subsequent contamination after excess silver ion is removed. The available removal techniques are not susceptible to such accurate control of residual silver ion. After all silver ion has been removed, of course, the problem of subsequent contamination again arises. The problems of concentration control are primarily responsible for the failure of these processes to achieve commercial use.

The use of solutions of silver compounds as a source of silver compounds and silver ion has been suggested, but such procedures have never achieved commercial prominence either. In some cases, the compounds are more toxic than silver ion itself, and they also are difficult to dissolve at a rate sufficient to reach but not to exceed the required concentration in a water line. Patent No. 1,473,331 suggests the use of silver chloride, silver oxide or silver sulfocyanate (i.e., thiocyanate) in conjunction with a gold or platinum activator for sterilizing water. Patent No. 2,595,290 discloses the purification of water by means of a three component composition, one component thereof being a carrier coated with either silver chloride or silver sulfide.

However, the use of the rather soluble silver chloride or silver oxide for water sterilization still requires careful control of the amount of the compound dissolved to maintain the silver ion concentration below the toxic limit. Moreover, silver thiocyanate is extremely toxic due to the thiocyanate ion. Thus, these processes also require a supplemental step for removal of excess silver ion after sterilization has been effected. On the other hand, silver sulfide is extremely insoluble, and a saturated silver sulfide solution will not contain enough silver ion to obtain complete sterilization. In any case, it is essential to furnish a bed of silver compound which will reliably supply the required silver ion concentration to water passed through it, and the suggested compounds do not meet this requirement.

In accordance with this invention, silver ion is supplied to water intended for human consumption in an amount sufficient to obtain complete sterilization without exceeding the toxic concentration limit, and thus the step of removing excess silver ion is eliminated. Consequently, enough silver ion can be supplied to the water to serve as a reserve after sterilization, to prevent further contamination thereafter. In this way, both concentration control and subsequent contamination are eliminated in one step.

In the practice of this invention, water to be sterilized is contacted with solid silver bromide as the source of silver ion. The silver bromide is in a surface condition, and the contact is for a time and at a temperature sufficient, to dissolve sufficient silver bromide therein to ensure a concentration of silver ion of from about 10 to about 50 parts by weight per billion parts by weight of water. Preferably, at least about 20 parts by weight of silver ion is dissolved per billion parts of water.

In the method of this invention, the silver bromide must be in a surface condition which permits solution of enough silver ion in the limited contact time with water to ensure complete sterilization of the water. Less than this is as bad as none at all, since survival of even only very small amounts of bacteria cannot be tolerated. Hence, a large surface area of silver bromide per unit volume of water is essential to permit the short contact times essential in a water supply line. It is also important to provide for a dwell time for such water containing silver ion to permit a complete kill of bacteria by the silver ion present. Finally, the surface condition must also be such that the toxic concentration of silver ion is not exceeded during the contact period.

The solid silver bromide can be in finely divided particulate form. Very fine powders are unsuitable for beds, since they tend to pack and channel. Coarse particles can be used, but are not readily available, and are costly because of the high cost of silver bromide. Moreover, whenever pure silver bromide particles are used, it is difficult to control silver bromide concentration to below a toxic level. Hence, it is preferable from the standpoint of surface condition as well as being economically desirable to use various water soluble or insoluble extenders for the silver compound. For example, the silver bromide can be mixed with or coated on sand, quartz crystals, charcoal, diatomaceous earth, asbestos fibers, calcium silicate, non-toxic resinous materials and other solid carriers, and a bed or column formed therefrom, through which water can be flowed.

The silver bromide can be made into tablets, using conventional tabletting means, with a suitable extender and a suitable binder substance, such as gelatin and the like. As a further alternative, the silver bromide, either alone or accompanied by any of the extenders, can be placed inside a water permeable container capable of preventing solid particles of silver bromide from escaping and the water permeable container can be placed in the water. Water passing through the container will dissolve the silver bromide to the extent permitted by the solubility of the silver compound and the flow rate and volume of the water.

A convenient particulate form is a carrier such as sand coated with silver bromide. Silver bromide-coated carriers can be prepared by mixing a fine grained insoluble carrier, such as sand, having an average particle size from about 20 to 50 mesh with enough silver bromide crystals to coat them fully. The mix is brought to a temperature from about 475° C. to 550° C. and stirred until the carrier particles are well coated, and thereafter cooled. This is a sintering process. Generally, from about 0.05 to about 4 grams of silver bromide are enough to coat a volume of 100 cc. of carrier. Any of the particulate carriers referred to above can be used, such as sand, charcoal, asbestos fibers, diatomaceous earth, calcium silicate and non-toxic resinous materials.

The water is contacted with the silver bromide for a time such that a sterilizing amount of silver bromide is dissolved. The volumes of water and silver bromide, the flow rate, the surface area of the silver bromide and the temperature are all factors that can be varied to achieve the desired silver ion concentration. The rate of solution will generally increase with increasing flow volume and/or velocity, temperature and decreasing particle size of the silver bromide.

Where the risk of subsequent contamination is negligible, the flow in contact with the solid silver bromide can be adjusted to obtain an amount of silver ion just above the minimum required for sterilization, i.e., from about 10 to about 15 parts of silver ion per billion parts of water. When it is desired to ensure against subsequent contamination, however, a larger quantity of silver ion sufficient to yield at least 15 parts by weight of silver ion per billion parts of water is desirable.

The silver bromide and carrier, if any, are conveniently disposed in a water treating column or water softening tank, or as all or part of the particulate bed components of a bed filter, and if so used would serve the purpose of both filtering and sterilizing the water passing through the filter.

After the water is passed through the silver treatment column, it is retained in a retention tank for a period of time and at a temperature sufficient to permit the silver ion to kill any bacteria present.

An apparatus for carrying out the sterilization process of this invention is illustrated in the appended drawings, wherein.

Figure 1:
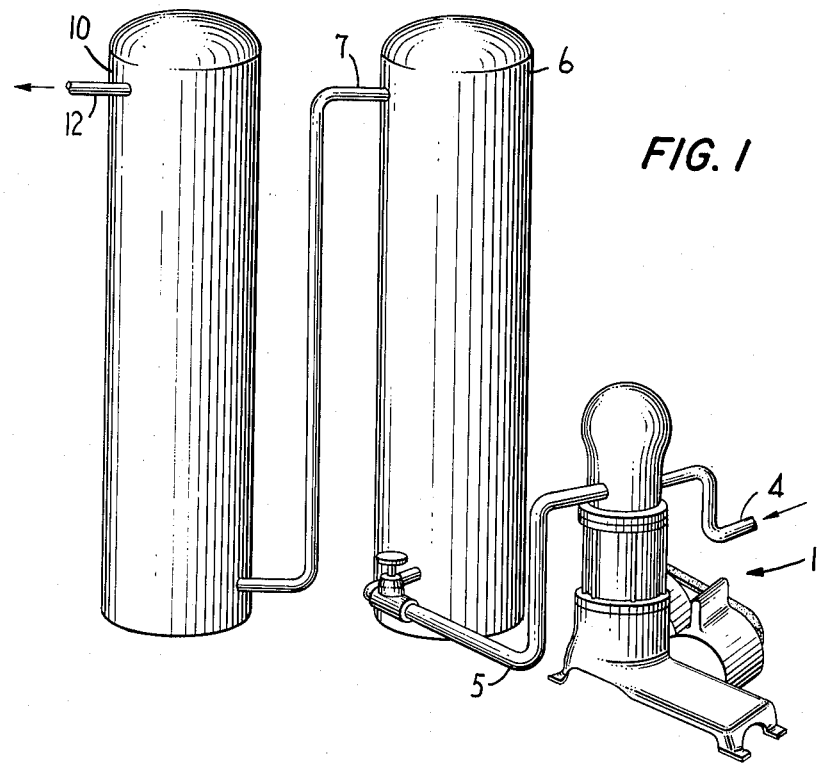
FIG. 1 illustrates a combination pump and sterilizer unit.
Figure 2:
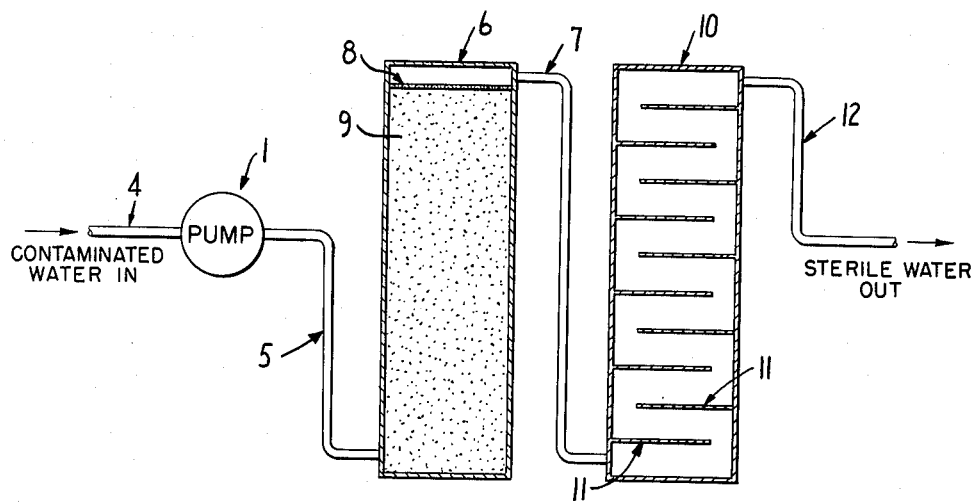
FIG. 2 is a cross-sectional view of the sterilizer tank of FIG. 1.

In the drawings, the water treatment system shown in FIG. 1 includes a pump 1 of the diaphragm type, a water sterilizer tank 6 on the outlet side of pump 1, and a retention tank 10 on the outlet side of water sterilizing tank 6. Water from the well or other source of supply enters the treatment system by a line 4 on the suction side of the pump, and merges from the pump through line 5 on the pressure side of the pump, passing thence to the bottom of the tank 6, emerging from tank 6 containing silver ion between 10 and 50 parts per billion at outlet 7, passing thence to the bottom of storage tank 10 and emerging finally from the system in purified and sterilized condition at the outlet 12. The water is retained in tank 6 for a sufficient time to dissolve sufficient silver ion to produce the required concentration, before emerging at outlet 7, and in the retention tank 10 for a sufficient time for the silver ion to kill all bacteria. Sterilizing tank 6, as more clearly illustrated in FIG. 2, is filled with silver bromide-coated sand particles 9, and a suitable filter 8 to prevent sand particles from leaving the tank with the effluent water stream. The rate of flow of the water is controlled so as to be sure that water being treated is held within tank 6 for a period of at least 15 minutes, and preferably for at least 20 to 25 minutes. It has been found that water treated in this manner acquires a silver-ion concentration of 17 parts per billion, less than the maximum silver tolerance.

Retention tank 10, as illustrated in FIG. 2, is fitted with baffles 11 to prevent mixing of the water in the tank so that water must be retained in the tank for at least 2 hours at the normal flow rate before emerging from outlet 12, and is thereby rendered completely free of pathogenic microorganisms.

The following example in the opinion of the inventor represents a preferred embodiment of this invention.

*Example 1*

Silver bromide was coated on sand by mixing together 230 grams of silver bromide and 40 pounds of sand (20–50 mesh) at 550° C. with stirring to ensure uniform coating of the sand. Stirring was continued for 20 minutes, after which the contents were allowed to cool. The resulting coated sand was placed in a tower of the type shown in FIGURE 1. Contaminated water containing *Escherichia coli* was passed through the bed slowly at room temperature to ensure a contact time of 20 minutes and was passed through a retention tank with a retention time of 2 hours. The water emerging from the bed was tested, and was found to be completely sterile. 100% of the bacterial content was killed. The concentration of silver ion in the water emerging from the retention tank was 17 parts per billion.

I claim:

1. A process for sterilizing water intended for human consumption comprising flowing the water to be sterilized into contact with solid silver bromide coated on an inert particulate carrier by sintering therewith at a sintering temperature within the range from about 475° to about 550° C., thereby being put in a surface condition to obtain a non-toxic sterilizing concentration of silver ion in solution in the water.

2. A process as in claim 1 wherein the carrier is sand.

3. A process as in claim 1 wherein the flow volume and flow velocity are controlled so as to achieve a silver ion concentration in the water within the range of from about 10 to about 50 parts per billion parts of water.

4. A process as in claim 3 wherein the flow volume and flow velocity are controlled so as to maintain a dwell time for the water in contact with silver ion of at least 15 minutes.

5. A composition for sterilizing water comprising solid silver bromide coated on an inert particulate carrier, by sintering therewith at a sintering temperature within the range from about 475° to about 550° C.

6. A composition as in claim 5 wherein the carrier is sand.

7. A composition as in claim 5 wherein the carrier coating weight is within the range from about 0.05 to about 4 grams silver bromide per 100 cc. of carrier.

References Cited by the Examiner

UNITED STATES PATENTS

| | | | |
|---|---|---|---|
| 1,642,089 | 9/1927 | Schreier | 210—64 |
| 2,396,515 | 3/1946 | Kreidl et al. | 167—17 |
| 2,595,290 | 5/1952 | Quinn | 210—64 |

MORRIS O. WOLK, *Primary Examiner.*

E. G. WHITBY, *Assistant Examiner.*